Nov. 22, 1927.

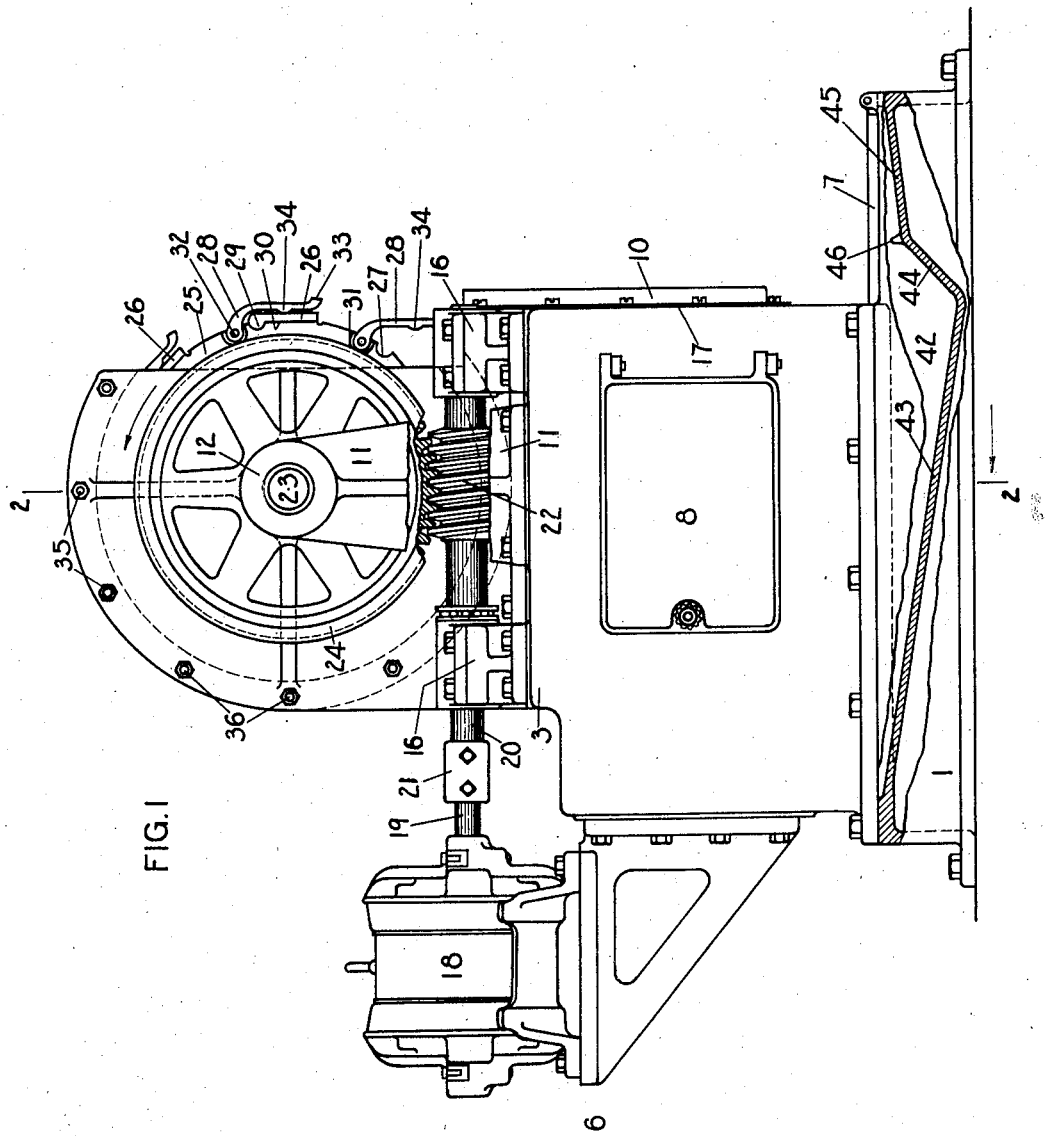

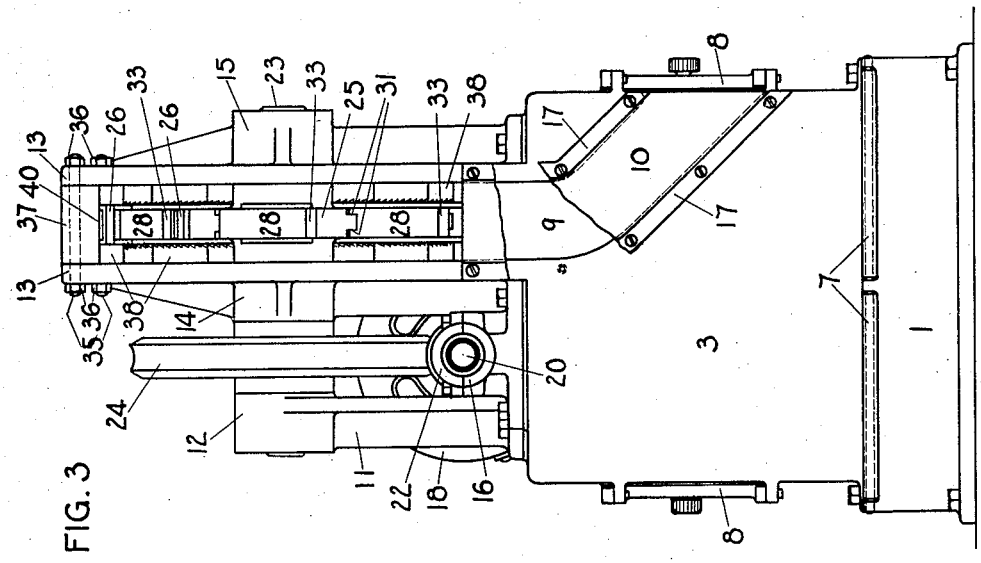
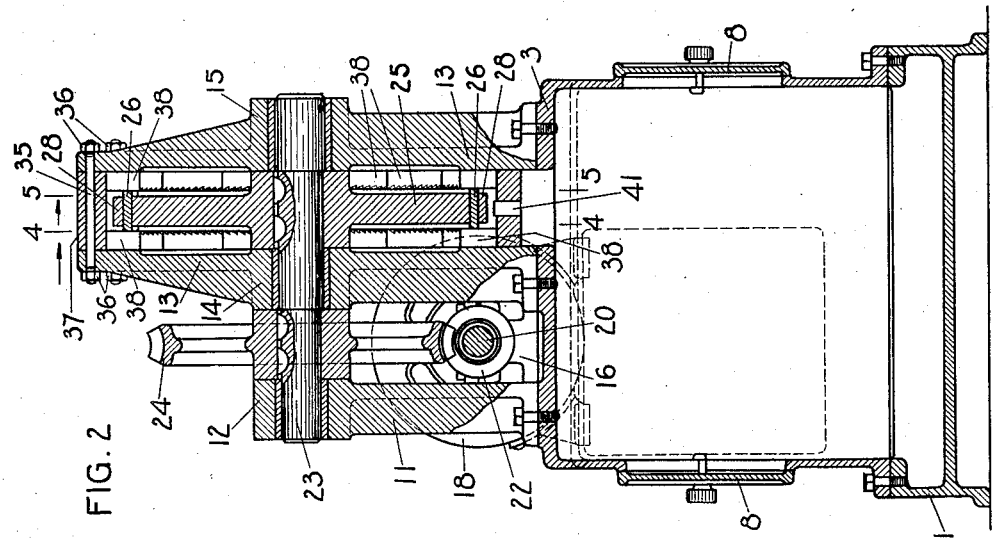

J. OAKLEY 1,650,033

BROACHING MACHINE

Filed March 25, 1926    3 Sheets-Sheet 3

INVENTOR.
John Oakley,
BY
Frank A. Cutter,
ATTORNEY.

Patented Nov. 22, 1927.

1,650,033

UNITED STATES PATENT OFFICE.

JOHN OAKLEY, OF SPRINGFIELD, MASSACHUSETTS, ASSIGNOR, BY MESNE ASSIGNMENTS, TO PERKINS MACHINE AND GEAR COMPANY, OF SPRINGFIELD, MASSACHUSETTS, A CORPORATION OF MASSACHUSETTS.

BROACHING MACHINE.

Application filed March 25, 1926. Serial No. 97,260.

My invention relates to improvements in machines designed more especially for cutting, facing off, or machining plain surfaces, and consists essentially and generally of a rotary work holder mounted on a suitable support, and a holder for stationary or fixed cutters or broaches, mounted on said support in position to cause such broaches to act on the work carried by said work holder, all being of novel construction, and combined in a novel manner, together with such other parts and members as may be necessary or desirable in order to render the machine complete and serviceable in every respect, as hereinafter more fully set forth.

The primary object of my invention is to produce a machine, of the class described, wherein the sides, edges, or surfaces of various objects can be cut or faced in an accurate and most expeditious manner. When this machine is set to operate on certain kinds of work, it is possible to turn out with the same an almost continuous stream of finished parts or objects, all of the operations, except that of placing on or in the work holder the parts or objects to be finished, being automatic.

Another object is to produce such a machine which is comparatively simple and inexpensive in construction, and very simple in operation, strong and durable, and not liable to get out of order.

A further object is to provide the machine with means, for attaching the broaches thereto and holding them in operative position therein, which enable said broaches to be readily removed and replaced whenever necessary.

Still another object is to afford the machine with means whereby, with little or no difficulty, the work holder can be removed and replaced, and the broach holder in whole or in part can be removed and replaced.

Other objects and advantages will appear in the course of the following description.

A preferred form or embodiment of the invention, whereby I attain the objects and secure the advantages of the same, is illustrated in the accompanying drawings, and I will proceed to describe the invention with reference to said drawings, although it is to be understood that the form, construction, arrangement, etc., of the parts and members in various aspects, are not material, and may be modified without departure from the spirit of the invention.

Figure 4:
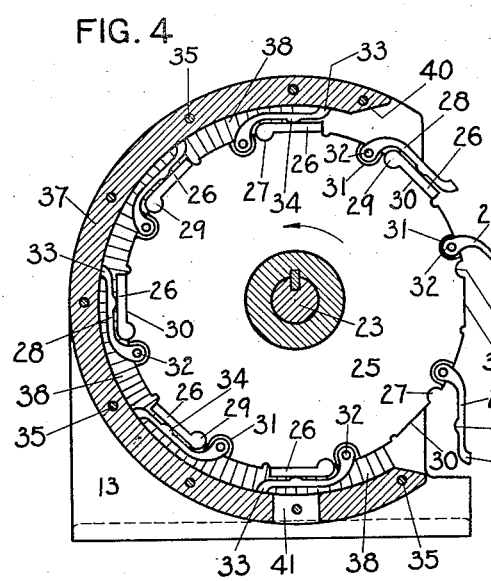
Figure 6:
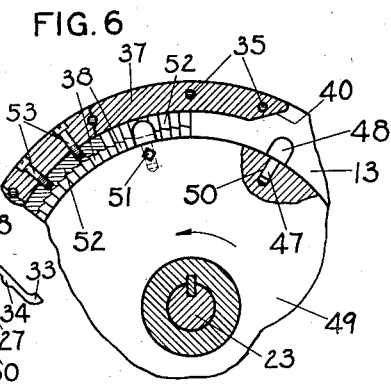
Figure 5:
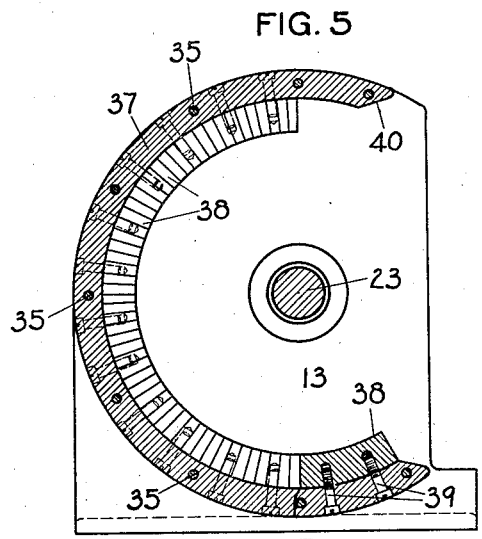
Figure 7:
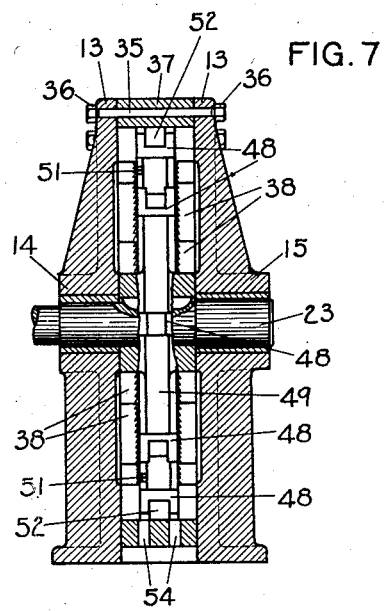

In the drawings, in which similar reference characters designate similar parts throughout the several views, Figure 1 is a side elevation of a broaching machine which embodies a practical form of my invention as aforesaid, parts of the base being broken away to show the interior construction of the same, and parts of the bearing bracket and worm-wheel also being broken away to show the worm in engagement with said worm-wheel; Fig. 2, a vertical, transverse section through said machine, taken on lines 2—2, looking in the direction of the associated arrow, in Fig. 1; Fig. 3, a front elevation of the machine, with a portion of the cover for the discharge chute broken out; Fig. 4, a vertical section through the upper part of the machine, on lines 4—4, looking in the direction of the associated arrow, Fig. 2; Fig. 5, a similar section, but taken on lines 5—5, Fig. 2; Fig. 6, a fragmentary detail generally similar to Fig. 4, but illustrating a modification of the construction therein shown; Fig. 7, a vertical section corresponding to a portion of Fig. 2, but illustrating the modification, and, Fig. 8, a fragmentary detail generally similar to Fig. 5, but illustrating a modification of the construction therein shown.

In each of Figs. 5 and 6, a portion of one of the broach sections is broken away to show fully the means by which the same is secured to the bed therefor of the broach holder; and a portion of the work-holder disc also is broken away, in Fig. 6, to disclose in full one of the openings therein for the shank or stem of the work which said disc is designed to carry.

The supporting frame of the machine consists of a hollow base 1, a superimposed bed 3, the space between said bed and the top of said base being enclosed, and the enclosing walls being considered as parts of the bed, and a bracket 6 extending rearwardly from said bed.

Covers and doors are provided as usual for the purpose of affording access to the interiors of the base 1 and the bed 3, two of such covers appearing at 7 for the base, and two of such doors appearing at 8 for the bed. The base 1 extends forwardly beyond the front end of the bed 3, and the covers 7 are over such projecting part. The doors 8, two in number, are on opposite sides of the bed 2. In the front side of the bed 3 is a chute 9, and a cover 10 is provided for said chute. Mounted on and secured by bolts or other means to the bed 3 is a vertical bracket 11 having a bearing 12 at the top, and also a pair of broach-holder plates, side pieces, or uprights 13 having an intermediate bearing 14 and an end bearing 15. The bracket 11 is at the left-hand side of the machine, and one of the side pieces or plates 13 is at the right-hand side of the machine, while the other side piece or plate 13 is in an intermediate position. The plates 13 are spaced apart and parallel with each other, substantially as shown, and their bearings 14 and 15 and the bearing 12 have a common axis. The bearing 14 is shorter than the bearing 15, and said bearings form parts of the inner and outer plates or uprights 13, respectively. Mounted on and secured to the bed 3, at the front and rear ends of the same, and in the vertical, central plane between the bracket 11 and the inner plate 13, are two bearings 16 having a common axis.

The chute 9 is of the same width as the space between the uprights 13, and said chute extends directly downwardly a distance from the front edges of said uprights, and then downwardly and outwardly to the right, to open adjacent to the right-hand, front corner of the bed 3. The cover 10 has at opposite edges flanges 17 which are secured by screws or other means to the front of the bed 3 on each side of the chute 9, and to the front edges of the plates 13, said cover being of a shape to conform to that of said chute, and of sufficient length to extend a little distance above the top of said chute onto said plates.

An electric motor 18, which furnishes the motive power for the machine, is mounted on and secured by bolts or other means to the bracket 6, and has a shaft 19. A shaft 20 is journaled in the bearings 16, and rotatably connected with the motor shaft 19 by means of a coupling 21. Secured to the shaft 20 is a worm 22. A shaft 23 is journaled in the bearings 12, 14, and 15, and mounted on and secured to said shaft, between said two first-named bearings, is a worm-wheel 24. The worm 22 is beneath and in position to intermesh with the worm-wheel 24.

Mounted on and secured to the shaft 23, between the plates 13, is a disc 25, which is driven in the direction of the associated arrow, from the motor 18, through the medium of the shaft 19, coupling 21, shaft 20, worm 22, worm-wheel 24, and said shaft 23.

The work holder, which consists in part of the disc 25, is constructed to carry hinge leaves, such as are represented at 26, between broach elements which cut or face off the side edges of such leaves. The disc 25 has at intervals around the periphery thereof indentations or recesses 27, and is equipped with a corresponding number of latches 28. Each recess 27 extends across the periphery of the disc 25, and is deep enough and of the size and shape required to receive the convex part 29 on the under side of each leaf 26, when said leaf is in place on said disc, and behind (in the direction of rotation of the disc) said recess is a flattened part or bed 30 on said periphery, of sufficient length to receive and support the under side of said leaf between said convex part and the plain end of the same. Each latch 28 is bifurcated at one end, and the disc 25 is recessed on each side, as indicated at 31, to receive one side of such bifurcated end, and said end is pivotally connected at 32 with said disc. Thus it is seen that the part of the disc 25 which is between the recesses 31 in each side thereof is received in the space between the sides or arms at the bifurcated end of the latch 28, while said arms are received in said recess. The pivotal connection between each latch 28 and the disc 25 is forward (in the direction of rotation of said disc) of one of the recesses 27. The latch 28 is, therefore, in position to be swung over a leaf 26 placed on the adjacent flat part or work bed 30 of the disc. The latch curves outwardly from its pivotal end, and then is made approximately straight as far as its free end or tail which is turned outwardly to form a locking lug 33. On the under side intermeliate of the ends of the latch is a transverse rib 34, which is the part of said latch that comes into direct contact with the hinge leaf, on the outer, broad side thereof. The parts and members are so proportioned that, when any latch 28 bears with its rib 34 on any leaf 26, the straight parts of said leaf and latch, and the bed 30, on which said leaf rests, are approximately parallel, and both longitudinal edges of the leaf project beyond said bed, and beyond said latch as well.

The front edge of each plate 13 is vertical, but the bottom portion of said plate projects forwardly beyond the main portion thereof, and the back edge of said plate is vertical from the bottom to the horizontal central plane thereof, and then extends over to meet the top of said front edge, in the form of an arc concentric with the disc 25, all as clearly shown in Figs. 1, 4, and 5. The disc 25 in front projects beyond the vertical plane in which are located the inset vertical edges of the plates 13. Secured by means of a plurality of bolts 35 and nuts 36 to the plates 13, between the same, is an arcuate bed 37 for two arcuate broach elements. The bolts 35 pass through the bed 37 from side to side and through and beyond the plates 13, and receive on their protruding terminals the nuts 36. These parts and members constitute the broach holder. The bed 37 at both ends extends beyond the vertical plane in which is located the axis of the shaft 23, and the outer, exposed surface of a portion of said bed is flush with the arcuate edges of the plates 13. The bed 37 and the two broach elements are concentric with the disc 25.

Each broach which is arcuate, I prefer to make in sections, rather than in a single piece. The sections are arranged end to end to make up the complete broach, and these sections may be either straight or arcuate, as will hereinafter clearly appear. It is preferred to make the broaches in sections because when so made they can be more readily repaired, and are more economical and generally superior in all respects, than if each consisted of a single piece.

In the construction illustrated in the first five views, there is an arcuate broach, made up of a plurality of arcuate sections 38, on each side of the broach holder. The sections 38 are secured to the concave side of the bed 37, against the inside faces of the plates 13, by means of a plurality of bolts 39. Two of the bolts 39 are provided for each broach section, and they pass through the bed 37 from the outside and are tapped into the section. The sections 38 have teeth on their inner or adjacent sides, and the space between the two sets, which make up the two complete broaches, is sufficient to enable the hinge leaves 36 to be carried between the same in contact with said teeth, whereby the longitudinal edges of said leaves are faced off to the required extent and said leaves are cut to the required width.

The proportions of the parts are such that, when any latch 28 is closed on a piece of work, and said latch is carried into the broach holder, the lug 33 of said latch contacts with the central portion of the inner face of the bed 37, and is thereby forced inwardly, with the result that said latch is caused to press hard against the work and clamp the same onto the supporting bed 30. In this manner and by this means the work is securely held in place on the disc 25 during the broaching operation, inasmuch as the convex part 29 of the work is in one of the recesses 27, so that the work, being held against its bed as it is by the latch, can not move endwise, and, of course, the work can not move laterally because it is in engagement with the broaches.

The space between the oppositely-disposed broaches, made up of the sections 38, at the upper end, where the work first comes into contact with said broaches, may be a little wider than it is at the lower end, where said work leaves said broaches. The upper ends of the two sets of broach sections 38 are in the same vertical plane in which the axis of the shaft 23 is located, and the lower ends of said sections are a little in advance of such plane. The upper front end of the bed 37 is beveled, as shown at 40, to facilitate the passage beneath said bed of the latch lugs 33, such beveled part really serving as a fixed cam for said lugs.

The diameter of the disc 25 is somewhat greater than the lesser or inner diameter of the broaches, consequently the peripheral portion of said disc enters and passes between said broaches, but said disc is narrower than the space between said broaches, hence does not contact with them.

There is formed in the bottom of the bed 37 an opening 41 for the escape of the chips or particles cut from the work by the broaches. The chips find their way to the opening 41, and pass down through the same and through the bed 3 into the base 1. The opening 41 is narrower than the tail of any latch 28, and does not, therefore, interfere with the clamping action produced by the contact of such tail with the bed 37.

A pit 42 is formed in the base 1 to receive the chips. This pit has a floor which inclines rearwardly and upwardly, as at 43, and forwardly and upwardly, as at 44, with its deepest part near the front end thereof, and from the part 44 there is a platform 45 which inclines upwardly and forwardly to the front side of the base 1—see Fig. 1. A series of upstanding teeth may be provided along the rear edge of the platform 45, one such tooth appearing at 46. The platform 45 and the inclined part 44 of the floor of the pit 42 are below the covers 7.

When it is necessary to remove the accumulation of chips from the pit 42, the covers 7 are opened, a suitable implement is thrust down into said pit, and the chips are raked up onto the platform 45, where the teeth (46) prevent the chips from being washed back, with the oil which drains out of said chips and flows back between said teeth, into said pit. Then the chips are removed from the platform 45.

Assuming that the current has been turned on to the motor 18 and the disc 25 is rotating in the direction of the associated arrow, the operation of the machine is described as follows:

The operator, standing in front of the machine, places a hinge leaf 26 on each bed 30, with the convex part 29 in the recess 27 at the leading end of said bed, as said bed arrives in front of him, first, however, lifting the latch 28 associated with said bed, or swinging it upward far enough to enable said leaf to be so placed, and then he swings said latch down onto said leaf. The disc 25 carries the latches 28 successively beneath the bed 37 at the top, and the lugs 39 at the free ends of said latches ride beneath the cam surface 40 and into engagement with the inner surface of said bed, thus securely clamping the leaves in place on their beds 30. One after another the leaves are carried into engagement with the two sets of broad sections 38, by the revolving disc 25, and between such sets throughout their entire lengths. Both of the exposed and protruding lateral edges of the leaves 26 are thus cut. As the disc 25 carries the latches 28 beyond or forward of the lower, front end of the bed 27, each latch assumes by gravity an approximately vertical position, and the finished leaf 26 which was held in place by said latch immediately drops by gravity into the chute 9, the release of said leaf occurring when the leaf arrives at a point directly over the open, upper end of said chute. Thus the unfinished parts are fed to the machine, and the finished parts are discharged automatically from the machine in practically a continuous operation and for an indefinite period. A suitable receptacle (not shown) may be placed at the lower end of the chute 9 to receive the finished work pieces as they drop from the work holder into said chute.

It would be possible, with the machine just described, to face off only one side or edge of the work, by employing a set of broach sections 38 on that side only.

Upon unscrewing the nuts 36, on one side of the broach holder, from the bolts 35 and withdrawing said bolts, the bed 37 can be removed from between the plates 13, inasmuch as the opening between the ends of said bed is large enough to enable the bed to clear the disc 25; and, upon removing the two bolts 39 which secure any of the broach sections 38 to said bed, such section can be removed. Thus it is seen that the bed of the broach holder can be readily taken out and another substituted therefor, the other being adapted to carry different broaches; and that one or all of the broach sections can readily be removed for regrinding, or in order to permit other sections to be substituted therefor.

In order to remove the disc 25 that another work-holder disc may be substituted therefor, it is necessary to remove the shaft 23.

As one of the quite numerous modifications of this machine or adaptations of the same for broaching other objects than the hinge leaves 26, I have illustrated the changes necessary in the machine whereby it is adapted to face off the outer and inner sides of bifurcated objects or articles, special reference being had to Figs. 6 and 7.

The objects or work which will be considered in connection with the machine as modified, may be assumed to be universal-joint sections, each of which comprises a stem or shank 47 and a bifurcated or forked head 48 at one end of said shank.

In place of the work-holder disc 25 equipped with the latches 28, I here employ a disc 49 having in its periphery a plurality of radial openings 50 to receive the shanks 47 of the work, and provided with a plurality of bolts 51 tapped into one side of said last-named disc in positions to penetrate said radial openings and engage said shanks.

The broach holder, in this case, is practically the same as the broach holder in the other case, and there are two side broaches substantially like those previously described, but in addition to these broaches is a central broach. The aforesaid central broach is made up of a plurality of sections 52 secured by means of bolts 53 to the bed 37, midway between the sections 38 that are secured to said bed by the bolts 39. There are two bolts 53 for each section 52, as clearly shown in Fig. 6. The sections 52 may and here do have teeth on all of their exposed sides, and said sections are not as deep as the sections 38. The sides of each head 48 are longer outside than inside, and it is on this account that the sections 38 are deeper than the sections 52.

In practice and initially, as the disc 49 revolves and one opening 50 after another presents itself to the operator, he places therein one shank 47 after another, and tightens successively the bolts 51, being careful each time to position the universal-joint section with its head 48 resting on the periphery and with its sides parallel with the sides of said disc. The width of each head 48 is greater than the thickness of the disc 49, and said head projects beyond said disc on both sides. The space between the side broaches is a trifle less than the width of the unfinished head 48, consequently the outer faces of said head are faced off by the teeth of said broaches as the disc 49 revolves and carries said head between said broaches throughout their entire length. The width of the central broach is a little greater than that of the space between the unfinished arms of the head 48, and the depth of said broach is a little greater than the length of said arms inside, consequently, as said head is carried through the broach holder, the lateral teeth on said central broach cut away and finish the inner faces of said arms, and the teeth on the concave side of said broach cut away and finish the bottom or inner end of said space, or, in other words, said broach machines the three inner sides of said head.

As each finished universal-joint section arrives in front of the operator, he loosens the bolt 51 which engages the shank 47 of said section, withdraws said shank from the disc 49, inserts the shank of an unfinished universal-joint section in said opening, and retightens said bolt.

Necessarily the disc 49 must revolve at a speed which is slow enough to permit the operator to attach the work thereto and remove it therefrom.

The removal of the work holder, the removal of the broach-holder bed 37 with the broaches attached thereto, and the removal of said broach sections from said bed, are all effected in substantially the same manner as in the other example, and the parts and members are reassembled in substantially the same way as before.

In the broach bed 37, as shown in Fig. 7, there are two openings 54, instead of the single opening 41, for the escape of the chips, such openings being located at the bottom of said bed in positions generally corresponding to that of said single opening, but on opposite sides of the central broach, instead of in the transverse center of said bed.

Whenever the work-holder disc is out of the machine, free access to the broaches is afforded, and they can be removed and replaced without taking out the broach-holder bed.

Figure 8:
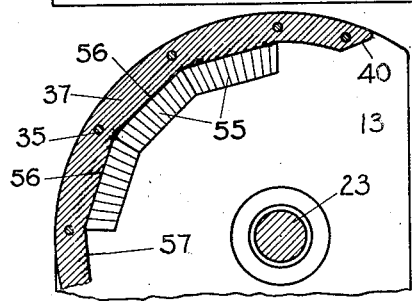

In many cases it will be found to be more economical and advantageous to employ straight broach sections 55 and provide flattened surfaces 56 on the concave side of the bed 37 for said sections, as shown in Fig. 8. The bed 37 can readily be machined to provide the flattened parts 56, and the straight broach sections 55 can be produced more cheaply, as a rule, than can the arcuate sections 38 and 52. Otherwise there need be no change in the construction, and this modification is adaptable in practically any case where arcuate broach sections might be employed. If the modification be employed in connection with the work holder which consists in part of the latches 28, the space, as 57, between the flattened parts 56 is left unchanged in order to form the necessary arcuate abutment for the lugs 33 at the ends of said latches, so that the latter shall be held in locking position on the work during the broaching operation. Although the sections 55 are straight, they are arranged on their bed 37 in such comparatively wide-angular relationship as to provide with their teeth a continuous, unbroken, or uninterrupted cutting element with which the work comes in contact, so that said sections constitute an arcuate broach. In other words, the actual cutting portions of the broach form a true arc.

The broach teeth may be shaped to cut grooves in the work, as well as to plane off flat surfaces thereof.

What I claim as my invention, and desire to secure by Letters Patent, is:—

1. In a broaching machine, a broach holder comprising fixed side plates, a bed, having an inner arcuate surface, secured to said plates, and means to secure a broach to said surface of said bed, and a work holder arranged to rotate between said plates and with the periphery of said holder adjacent to said arcuate surface, the teeth of said broach extending into the path of travel of work carried by said work holder.

2. In a broaching machine, a broach holder comprising fixed side plates, a bed having an inner arcuate surface, and removable means to secure said bed to said plates, a broach secured to said arcuate surface of said bed, and a work holder arranged to rotate between said plates and with the periphery of said holder adjacent to said arcuate surface, the teeth of said broach extending into the path of travel of the work carried by said work holder.

3. In a broaching machine, a broach holder comprising fixed side plates, and a bed, having an inner arcuate surface, secured to said plates, and removable means to secure a broach to said arcuate surface of said bed, and a work holder arranged to rotate between said plates and with the periphery of said holder adjacent to said arcuate surface, the teeth of said broach extending into the path of travel of the work carried by said work holder.

4. In a broaching machine, a broach holder comprising fixed side plates, a bed having an inner arcuate surface, removable means to secure said bed to said plates, and removable means to secure a broach to said bed, and a work holder arranged to rotate between said plates and with the periphery of said holder adjacent to said arcuate surface, the teeth of said broach extending into the path of travel of the work carried by said work holder.

5. In a broaching machine, a broach holder comprising fixed plates, an arcuate bed between said plates, bolts passing through said plates and said bed, and nuts for said bolts, a broach secured to said bed, and a work holder arranged to rotate between said plates, the teeth of said broach extending into the path of travel of the work carried by said work holder.

6. In a broaching machine, a broach holder comprising fixed side plates, and an arcuate bed secured to said plates, a broach adapted to fit said bed, radial bolts passing through said bed into said broach, and a work-holder arranged to rotate between said plates, the teeth of said broach extending into the path of travel of the work carried by said work holder.

7. In a broaching machine a rotary work holder, an approximately arcuate bed having flat places on the inner periphery thereof, and arranged concentrically about said work holder, and an approximately arcuate broach comprising sections arranged end to end on the flat parts of said inner periphery of said bed, the surfaces of said sections which make up the outer periphery of said broach as a whole being contiguous with said flat parts, and themselves being flat.

JOHN OAKLEY.